United States Patent
Ziegler et al.

(10) Patent No.: US 11,358,600 B2
(45) Date of Patent: Jun. 14, 2022

(54) CONTROL SYSTEM AND CONTROL METHOD FOR A MOTOR VEHICLE FOR PROCESSING MULTIPLY REFLECTED SIGNALS

(71) Applicant: ZF Active Safety GmbH, Koblenz (DE)

(72) Inventors: Eugen Ziegler, Neuwied (DE); Johannes Stiller, Koblenz (DE)

(73) Assignee: ZF ACTIVE SAFETY GMBH, Koblenz (DE)

( * ) Notice: Subject to any disclaimer, the term of this patent is extended or adjusted under 35 U.S.C. 154(b) by 0 days.

(21) Appl. No.: 16/695,235

(22) Filed: Nov. 26, 2019

(65) Prior Publication Data

US 2020/0172108 A1    Jun. 4, 2020

(30) Foreign Application Priority Data

Nov. 30, 2018  (DE) .......................... 102018009434.1

(51) Int. Cl.
*B60W 40/04*  (2006.01)
*B60W 40/105*  (2012.01)
*G08G 1/16*  (2006.01)

(52) U.S. Cl.
CPC .......... *B60W 40/04* (2013.01); *B60W 40/105* (2013.01); *G08G 1/165* (2013.01); *B60W 2554/00* (2020.02); *B60W 2554/80* (2020.02); *B60W 2556/45* (2020.02)

(58) Field of Classification Search
CPC ................ B60W 40/04; G08G 1/0965; G08G 1/096883; G08G 1/0969; H04W 4/90; H04W 4/80; B60Q 1/52

USPC .................................................. 340/435, 436
See application file for complete search history.

(56) References Cited

U.S. PATENT DOCUMENTS

| | | | | |
|---|---|---|---|---|
| 7,205,929 B2* | 4/2007 | Shingyoji | ............. | G01S 13/426 342/70 |
| 7,715,275 B2* | 5/2010 | Boecker | ................. | G08G 1/167 367/96 |
| 9,372,260 B2* | 6/2016 | Kambe | ................. | G01S 13/345 |
| 9,869,765 B2* | 1/2018 | Kuo | ...................... | G01S 13/931 |
| 10,451,724 B2* | 10/2019 | Shimizu | ................. | G08G 1/165 |
| 2007/0297288 A1 | 12/2007 | Boecker et al. | | |
| 2009/0121915 A1 | 5/2009 | Randler et al. | | |
| 2010/0085238 A1* | 4/2010 | Muller-Frahm | ...... | G01S 13/931 342/70 |

(Continued)

*Primary Examiner* — Eric Blount
(74) *Attorney, Agent, or Firm* — Tarolli, Sundheim, Covell & Tummino LLP

(57) ABSTRACT

A control system is suitable for use in a motor vehicle and is configured and intended for using information concerning objects and/or driving-related information about another motor vehicle in order to distinguish real objects in the surroundings of the motor vehicle from erroneously detected objects, based on surroundings data that are obtained from at least one surroundings sensor situated on the motor vehicle and provided to the control system. Based on these surroundings data, an object in the surroundings of the motor vehicle is detected, and a distance and/or a relative speed and/or an angle between the motor vehicle and the object are/is determined. The object is then classified as an actually existing object or as an erroneously detected object, based on the determined distance and/or based on the determined relative speed and/or based on the determined angle.

9 Claims, 7 Drawing Sheets

(56) References Cited

U.S. PATENT DOCUMENTS

| | | | |
|---|---|---|---|
| 2013/0093614 A1* | 4/2013 | Tokoro | G08G 1/166 342/109 |
| 2015/0185319 A1* | 7/2015 | Matsuura | G01S 15/931 73/627 |
| 2016/0252611 A1* | 9/2016 | Guecker | G06K 9/00214 342/70 |

* cited by examiner

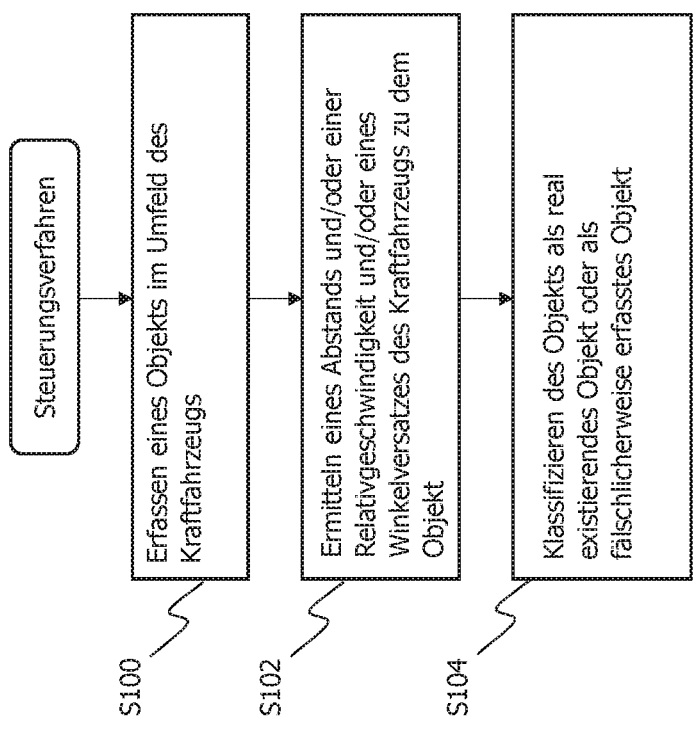

CONTROL SYSTEM AND CONTROL METHOD FOR A MOTOR VEHICLE FOR PROCESSING MULTIPLY REFLECTED SIGNALS

RELATED APPLICATION

This application claims priority from German Application No. 10 2018 009 434.1, filed Nov. 30, 2018, the subject matter of which is incorporated herein by reference in its entirety.

BACKGROUND OF THE INVENTION

A control system and a control method for a motor vehicle for distinguishing between actually existing objects and erroneously detected objects in the surroundings of the motor vehicle are described herein. The control system and the control method are based in particular on a surroundings sensor system in the motor vehicle that is able to process multiple reflections of sensor signals in order to efficiently assist a driver or an autonomously driving motor vehicle. For semiautonomous motor vehicles and autonomously controlled motor vehicles, computing resources are saved and the overall performance and robustness of the control system and/or further control systems of the motor vehicle are increased.

PRIOR ART

The detection of certain traffic situations and their correct interpretation represents a key aspect in the present development of (semi)autonomous motor vehicles. In these types of motor vehicles, current advanced driver assistance systems (ADAS) offer numerous monitoring and information functions for driving a motor vehicle in traffic, which is becoming increasingly heavier nowadays, in a safer and more comfortable manner. For this purpose, the surroundings of the motor vehicle are monitored, based on surroundings data obtained from one or more surroundings sensors situated on the motor vehicle.

Based on the obtained surroundings data, automatic speed control of the host (following) motor vehicle is adapted to the speed of the preceding (other) motor vehicle in so-called adaptive cruise control (ACC) systems, for example. A certain distance from the other motor vehicle must generally be maintained. For this purpose, the stated systems determine a possible movement direction and/or a speed of the preceding motor vehicle.

In motor vehicles that are driven by persons, the driver assistance systems usually provide an information function in order to warn the driver of a critical driving situation or to recommend a suitable maneuver to the driver of the host motor vehicle. The driver assistance systems may likewise be used in autonomously controlled motor vehicles in order to provide the autonomous control system with the appropriate surroundings data.

In ADAS systems that are common nowadays, increasingly sensitive sensors are being used for the most exact detection and assessment possible for an instantaneous driving situation, together with the host motor vehicle and the surroundings of the host motor vehicle. However, these sensors that are used are increasingly subject to systematic multiple reflections of sensor signals to be detected, for example when the host motor vehicle is following behind another motor vehicle, or on other reflective surfaces. In the case of following travel that is distance—controlled, this may result in faulty detections of objects that do not exist in reality (i.e., in the instantaneous driving situation), since thus far, these faulty detections have not been correctable as a function of dynamics. The faulty detections result in poorer performance of the overall system with regard to reduced accuracy, for example in distance control, and use of computing resources.

UNDERLYING PROBLEM

Driving situations may occur in road traffic that require a driver or an autonomous driver assistance system of a host motor vehicle to carry out a certain driving maneuver. For example, another motor vehicle traveling more slowly in front of the host motor vehicle, in the same lane, may require a heavy braking operation or an abrupt evasive maneuver that results in relatively high acceleration forces that adversely affect the occupants.

However, the instantaneous situation of the other motor vehicle is not constant, and in reality is continually changing. Thus, due to an accident, for example, other road users may intentionally or unintentionally make a lane change or change their speed, and in turn force the other motor vehicle to make a corresponding driving maneuver, such as the mentioned braking operation. It is very challenging for conventional driver assistance systems as well as human drivers to respond in an appropriate and timely manner to such changes in the instantaneous situation.

In particular in the area of surroundings that are highly reflective for the surroundings sensor system, from the standpoint of a control system, which is configured, for example, to actuate/control a driver assistance system, this results in systematic faulty detections due to multiple reflections. Other motor vehicles such as trucks and passenger vehicles may be recognized in each case, but their very presence results in the stated multiple reflections.

The object, therefore, is to provide a control system and a control method for a motor vehicle which, in an instantaneous situation that the motor vehicle is in, can distinguish faulty detections from real objects in order to then remove the faulty detections from a further processing chain by a control system of the host motor vehicle. This prevents responses by the control system and the control method to objects that do not exist in reality, resulting in improved performance of the overall system, i.e., the control system or the control method in conjunction with an ADAS system for (semi)autonomous driving.

PROPOSED SOLUTION

This object is achieved by a control system having the features of claim 1.

Preferred embodiments will become apparent from sub-claims 2-9 and the following description.

One aspect relates to a control system that is configured and intended for use in a host motor vehicle. This control system, based on surroundings data that are obtained from at least one surroundings sensor situated on the motor vehicle, distinguishes a real object in the surroundings of the motor vehicle from an erroneously detected object. The at least one surroundings sensor is configured for providing to an electronic control unit of the control system of the motor vehicle at least information concerning objects and/or driving-related information about other motor vehicles in an area in front of, to the side of, and/or behind the host motor vehicle. The control system is at least configured and intended for detecting an object in the surroundings of the motor vehicle, based on the provided surroundings data, and based on the provided surroundings data, determining at least one distance and/or one relative speed and/or one angle between the motor vehicle and the object. Lastly, the control system is at least configured and intended for classifying the object, based on the determined distance and/or the determined relative speed and/or the determined angle, as an actually existing object or as an erroneously detected object.

The erroneously detected object may be a faulty detection of the real object in the surroundings of the motor vehicle.

The control system may also be configured and intended for determining a relative acceleration between the motor vehicle and the object, based on the provided surroundings data. In these cases, the control system may also be configured and intended for classifying the object as an actually existing object or as an erroneously detected object, based on the determined relative acceleration.

The angle may, for example, be the angle between a virtually extended longitudinal axis of the motor vehicle and a sensor signal that is emitted at the motor vehicle or received at same. The angle may also indicate a change in angle compared to an angle, previously determined by the control system, between the virtually extended longitudinal axis of the motor vehicle and a sensor signal that is emitted at the motor vehicle or received at same at the time in question.

In certain embodiments, the control system may also be configured and intended for subjecting the classification to a plausibility check when the object has been classified as an erroneously detected object. In these cases, the object may be removed from subsequent processing by the control system and/or by the electronic control unit of the control system when the plausibility check shows that the object has been correctly identified as an erroneously detected object. In addition, the object that has been correctly detected as erroneous may be removed from other electronic control systems that are present in the motor vehicle, such as an ACC system.

The plausibility check prevents an incorrectly or erroneously detected object, or in other words, a real object that has been identified as an erroneously detected object, from being supplied to a further processing chain, and thus prevents the response to nonexistent objects in the surroundings recognition.

The plausibility check may show that the object has been correctly identified as an erroneously detected object when the angle between the object and the motor vehicle corresponds to an angle between another detected object and the motor vehicle, while the distance and/or the relative speed between the object and the motor vehicle are/is different from a distance and/or the relative speed between the other detected object and the motor vehicle.

The plausibility check may also show that that the object has been correctly identified as an erroneously detected object when the angle between the object and the motor vehicle corresponds to an angle between the other detected object and the motor vehicle, while an acceleration between the object and the motor vehicle is different from an acceleration between the other detected object and the motor vehicle.

The distance may in particular take on values that are several times, for example double or triple, the values of the distance, actually prevailing in the instantaneous driving situation, between the motor vehicle and the real object. The distance, prevailing in the situation, from the real object may be correctly determined by the control system of the motor vehicle based on the provided surroundings data of the at least one surroundings sensor, even without distinguishing between real objects and objects that do not exist in reality.

Alternatively or additionally, the plausibility check may show that the object has not been correctly identified as an erroneously detected object when the angle between the object and the motor vehicle does not correspond to an angle between another detected object and the motor vehicle, while a speed of the object is different from a speed of the other detected object. The actual speed of the real object in the instantaneous driving situation may be correctly determined by the control system of the motor vehicle, based on the provided surroundings data of the at least one surroundings sensor, even without distinguishing between real objects and objects that do not exist in reality.

Further plausibility checking in order to estimate more precisely whether the particular objects in the instantaneous driving situation have been correctly classified by the control system as real or as nonexistent may be carried out, for example, via a signal amplitude of a sensor signal that is received at the motor vehicle and reflected from the particular object, and/or via an appropriate radar cross section (RCS) or by use of other suitable parameters.

In certain embodiments, the control system may be configured and intended for including at least one reflection of at least one signal of the at least one surroundings sensor in the determination of the distance and/or the relative speed and/or the angle.

The signal of the at least one surroundings sensor may be a reception signal of the at least one surroundings sensor. This signal may have been emitted beforehand, for example by prompting from the control system or the ACC system of the motor vehicle, in order to determine driving-related information such as distance, speed, and/or acceleration of the other motor vehicle.

The reflection may be a multiple reflection (also referred to below as multiple reflections).

Individual reflections of the multiple reflections may occur on the object and/or on the motor vehicle.

The object may be a moving object. Accordingly, the object may be the other motor vehicle or any other road user in the surroundings of the motor vehicle. Alternatively, the object may be a nonmoving object such as a road sign or a guardrail. In addition, the object may be a movable object which, however, has not moved at the particular time of detection, such as a further, parked motor vehicle.

According to certain refinements, the control system may be configured and intended for analyzing the reflection of the at least one signal of the at least one surroundings sensor with regard to its signal strength.

The reflection or the multiple reflections in each case represent(s) reflected signals of a source signal that is emitted at the motor vehicle. Due to scattering and/or attenuation, the signals in question lose energy with each reflection, which in turn affects the measurable signal amplitude.

In certain embodiments, the at least one surroundings sensor may include a radar sensor and/or a lidar sensor.

However, the present disclosure is not limited thereto. Thus, in certain embodiments the at least one surroundings sensor may alternatively or additionally include a front camera, a rear camera, a side camera, and/or an ultrasonic sensor situated at the appropriate location.

A further aspect relates to a control method, which in a motor vehicle distinguishes a real object in the surroundings of the motor vehicle from an erroneously detected object, based on surroundings data obtained from at least one surroundings sensor situated on the motor vehicle. The control method is carried out in particular by means of a control system as described above. The control method includes the steps:

Detecting an object in the surroundings of the motor vehicle, based on the provided surroundings data, Determining at least one distance and/or one relative speed and/or one angle between the motor vehicle and the object, based on the provided surroundings data, and Classifying the object as an actually existing object or as an erroneously detected object, based on the determined distance and/or the determined relative speed and/or the determined angle.

Yet a further aspect relates to a motor vehicle that includes a control system as described above.

Compared to conventional driver assistance systems and other control systems used in motor vehicles for (semi) autonomous driving, the approach presented here improves the overall performance in terms of robustness and efficiency, since the entire surroundings of the host motor vehicle, and thus the instantaneous traffic situation, are fully and continuously taken into account by the control system, based on the information, contained in the surroundings data, concerning objects in the surroundings of the motor vehicle and/or information about the instantaneous travel status of the other motor vehicle in the area in front of, to the side of, and/or behind the host motor vehicle in order to distinguish objects that actually exist in the surroundings from nonexistent objects that are not real, i.e., faulty detections, and then to remove these faulty detections from a further processing chain of a control system of the motor vehicle. As a result of the faulty detections undergoing a plausibility check, the accuracy in the recognition of faulty detections is increased, which in turn has a positive effect on the overall performance of the control system and/or other control systems of the motor vehicle. The surroundings data obtained by means of the at least one surroundings sensor change constantly according to the actual traffic and driving situation.

It is apparent to those skilled in the art that the aspects and features described above may be arbitrarily combined in a control system and/or a control method. Although some of the above-described features have been described with regard to a control system, it is understood that these features are also applicable to a control method. Similarly, the features described above with regard to a control method are correspondingly applicable to a control system.

BRIEF DESCRIPTION OF THE DRAWINGS

Further aims, features, advantages, and possible applications result from the following description of exemplary embodiments, which are not to be construed as limiting, with reference to the associated drawings. All features described and/or graphically illustrated, alone or in any combination, constitute the subject matter disclosed herein. The dimensions and proportions of the components shown in the figures are not to scale.

FIG. 7 shows a flow chart for a control method according to certain exemplary embodiments.

DETAILED DESCRIPTION OF THE DRAWINGS

Within the scope of the following disclosure, certain aspects are described primarily with regard to the control system. However, these aspects are of course also applicable within the scope of the disclosed control method, which may be carried out, for example, by a central control device (ECU) of a motor vehicle. This may take place by making suitable write and read access to a memory associated with the motor vehicle. The control method may be implemented within the motor vehicle as hardware or software, and also as a combination of hardware and software. Also included are digital signal processors, application-specific integrated circuits, field-programmable gate arrays, and other suitable switching and computing components.

Figure 1:
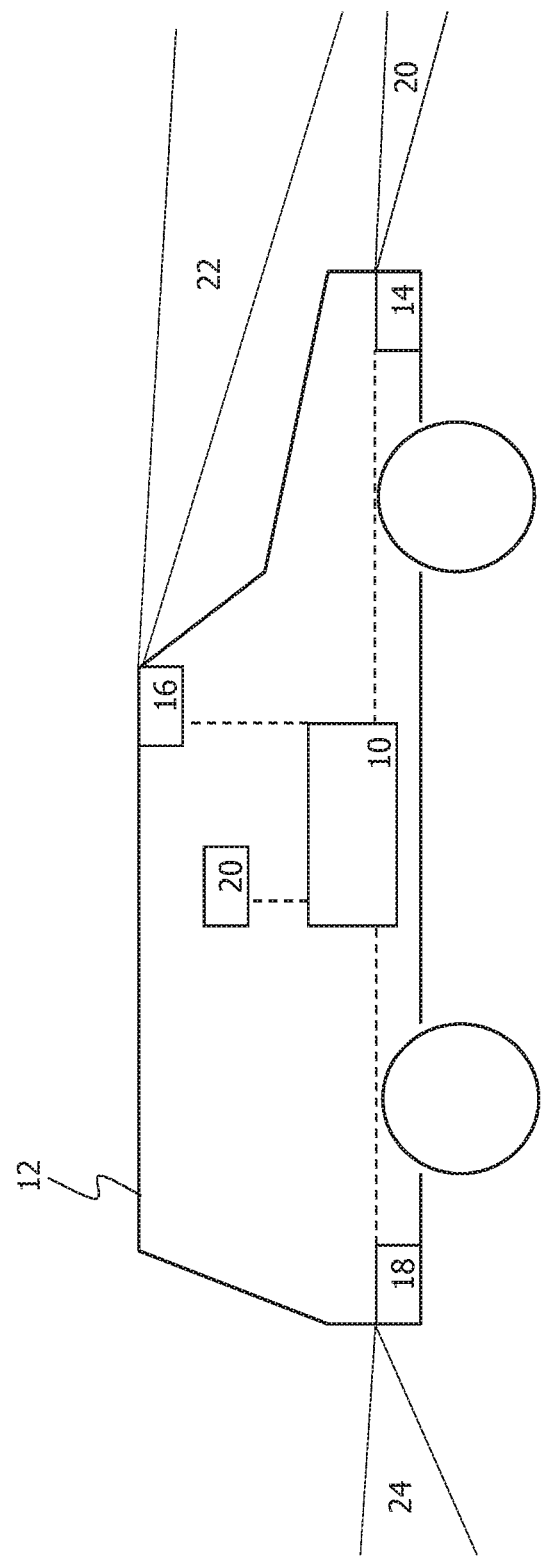
FIG. 1 schematically shows a motor vehicle having a control system and at least one surroundings sensor according to certain exemplary embodiments.

FIG. 1 schematically shows a motor vehicle 12 (also referred to below as host motor vehicle 12) that includes a control system 10. The control system 10 is coupled to at least one surroundings sensor 14, 16, 18 situated on the motor vehicle 12 in order to obtain surroundings data from the at least one sensor 14, 16, 18. The control system 10 may include an electronic control unit (ECU), not illustrated in the figure. For example, the present control system 10 may be at least configured and intended, with the aid of the ECU and/or other electronic control systems, for distinguishing a real object in the surroundings of the motor vehicle 12 from an erroneously detected object (also referred to below as faulty detection). For example, the ECU receives signals from the surroundings sensors 14, 16, 18, processes these signals and the associated surroundings data, and generates control signals and/or output signals.

FIG. 1 illustrates three surroundings sensors 14, 16, 18 which transmit appropriate signals to the control system 10 or the electronic control unit ECU. In particular, at least one surroundings sensor 14 that detects an area 20 in front of the motor vehicle 12 is situated on the motor vehicle 12 facing the front in the travel direction of the motor vehicle 12. This at least one surroundings sensor 14 may be situated, for example, in the area of a front bumper, a front light, and/or a front radiator grill of the motor vehicle 12. Thus, the surroundings sensor 14 detects an area 20 directly in front of the motor vehicle 12.

At least one additional or alternative surroundings sensor 16, likewise facing the front in the travel direction of the motor vehicle 12, is situated in the area of the windshield of the motor vehicle 12. For example, this surroundings sensor 16 may be situated between a rearview mirror of the motor vehicle 12 and its windshield. Such a surroundings sensor 16 detects an area 22 in front of the motor vehicle 12; depending on the design of the motor vehicle 12, an area 22 directly in front of the motor vehicle 12 cannot be detected due to the front section (or geometry) of the motor vehicle 12.

In addition, at least one surroundings sensor 18 may be situated at the side and/or the rear of the motor vehicle 12. This optional surroundings sensor 18 detects an area 24 to the side of and/or behind the motor vehicle 12 in the travel direction of the motor vehicle 12. For example, the data or signals of this at least one surroundings sensor 18 may be used to verify information that is detected by the other surroundings sensors 14, 16, and/or to determine a curvature of a lane traveled on by the motor vehicle 12.

The at least one surroundings sensor 14, 16, 18 may be implemented in any desired manner, and may include a front camera, a rear camera, a side camera, a radar sensor, a lidar sensor, an ultrasonic sensor, and/or an inertial sensor. For example, the surroundings sensor 14 may be implemented in the form of a radar, lidar, or ultrasonic sensor or a front camera. A front camera is particularly suited for the surroundings sensor 16 situated at a higher level, although a radar, lidar, or ultrasonic sensor may be provided here as well. In addition, the surroundings sensor 18 situated in the rear of the motor vehicle 12 may be implemented in the form of a rear camera or a radar, lidar, or ultrasonic sensor.

The electronic control unit ECU processes the surroundings data obtained from the surroundings sensor(s) 14, 16, 18 situated on the motor vehicle 12 in order to detect a lane traveled on by the motor vehicle 12 via a first and a second lateral lane marking in front of the motor vehicle 12. In addition, the electronic control unit ECU processes the surroundings data obtained from the surroundings sensor(s) 14, 16, 18 situated on the motor vehicle in order to detect a lane traveled on by another motor vehicle (the lane adjacent to the lane traveled on by the host vehicle, where "adjacent" means that one or more further lanes may also be situated between the adjacent lanes), and its lateral lane markings in front of the motor vehicle. For this purpose, the surroundings sensors 14, 16, 18 of the electronic control unit ECU provide surroundings data that represent the area in front of, to the side of, and/or behind the vehicle. To this end, the control system 10 is connected to the at least one surroundings sensor 14, 16, 18 via at least one data channel or bus (illustrated by dashed lines in FIG. 1). The data channel or bus may be implemented in a wired or wireless manner.

Alternatively or additionally, the control system 10 or its electronic control unit ECU may obtain data from one or more other (driver) assistance systems 20 or some other controller 20 of the motor vehicle 12 which indicate or allow the derivation of the lanes traveled on by the host vehicle, the other vehicle, and further motor vehicles via their lateral lane markings. Thus, data and information already determined by other systems may be used by the control system 10.

In addition, the control system 10 or its electronic control unit ECU determines a driving situation with the surroundings sensors, i.e., based on the surroundings data obtained using the at least one surroundings sensor 14, 16, 18. Here as well, an assistance system 20 or an electronic control unit 20 that is already present may alternatively or additionally supply data and/or information which define(s) a driving situation, or from which a driving situation may be quickly derived. Depending on the determined driving situation, certain objects detected in the driving situation, for example other motor vehicles or other road users, road signs, or guardrails, are detected by the control system 10. These objects, which represent actually existing objects within the meaning of this disclosure, are then differentiated from faulty detections, for example of the same objects, by means of the control system 10.

The driver assistance system 20 or the electronic control unit 20 may also be configured and intended for (semi) autonomously controlling the motor vehicle. In this case, the control system 10 is configured and intended for outputting data to the driver assistance system 20 or to the electronic control unit 20 for autonomous driving. In particular, the control system 10 (or its ECU) may output data that are based on actually existing objects or that represent same. The data may likewise be transmitted via a data channel or bus in a wired or wireless manner. On the other hand, data that are not based on actually existing objects or that do not represent same are not outputted by the control system 10 to the driver assistance system 20 or the electronic control unit 20 for autonomous driving. In this way, the faulty detections, i.e., unused data, are removed from the processing chain by the driver assistance system 20 or the electronic control unit 20. Computing resources are thus saved, and an efficient control 20 is realized.

Figure 2:
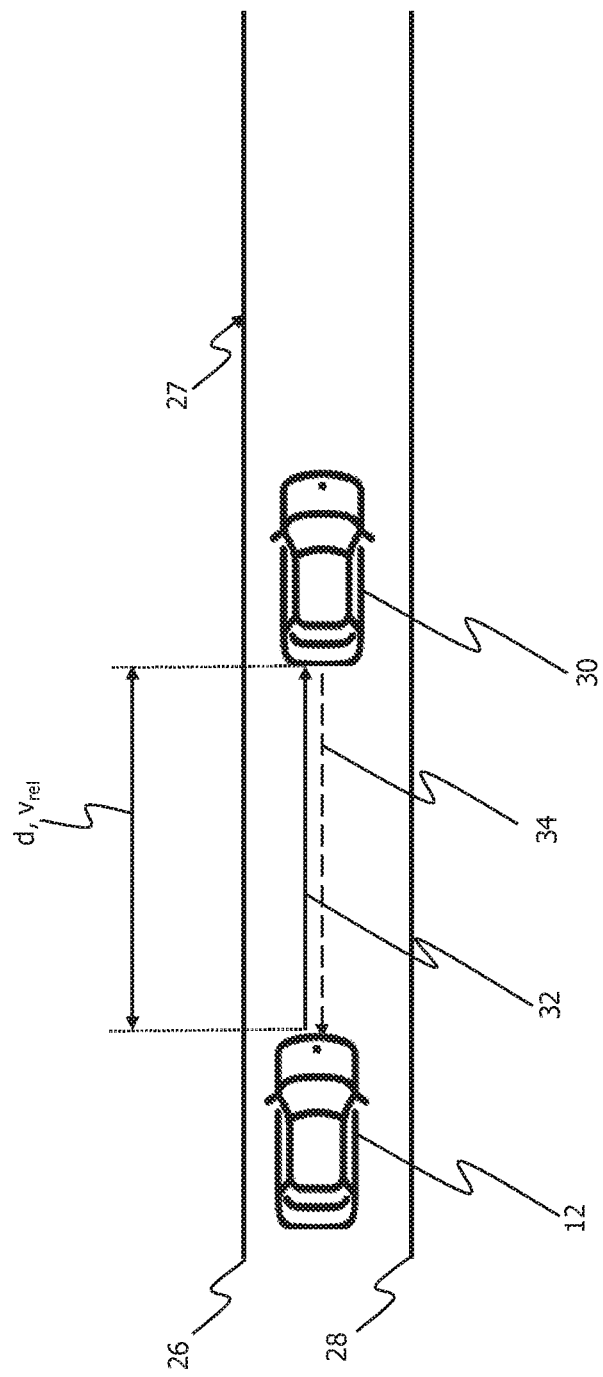
FIG. 2 schematically shows a driving situation with a motor vehicle and a moving object in the form of another motor vehicle, during following travel according to certain exemplary embodiments.

FIG. 2 schematically shows a driving situation in which the host motor vehicle 12 is traveling behind another motor vehicle 30 on a roadway 27 (following travel). The roadway 27 is delimited by a left (lateral) lane marking 26 and a right (lateral) lane marking 28. The illustrated example using one lane is not to be construed as limiting; the control system 10 and the control method presented here are likewise suited for use with two, three, four, or more adjacent lanes.

In the example shown in FIG. 2, the control system 10 of the host motor vehicle 12 detects the other motor vehicle 30 by means of the at least one surroundings sensor 14, 16, 18. FIG. 2 also illustrates an example of a signal 32 in the form of a radar wave that is emitted in the area of the front surroundings sensors 14, 16 of the motor vehicle 12, reflected on the rear of the other motor vehicle 30, and recognized as a reflected signal 34 (reflected radar wave) by the at least one surroundings sensor 14, 16, 18. However, the present disclosure is not limited thereto. The signal 32 may also be any other suitable radio wave, or some other electromagnetic signal such as a laser beam.

The signal 32 or the radar wave 32 may be emitted, for example, by prompting from the electronic control unit 20 of the control system 10. The control system 10 or its electronic control unit thus determines at least one distance d and one relative speed $v_{rel}$ between the motor vehicle 12 and the motor vehicle 30. In addition, for example a relative acceleration (not shown in the figure) between the motor vehicles 12, 30 may also be determined. The distance d in FIG. 2 denotes a longitudinal distance between the motor vehicle 12 and the other motor vehicle 30. In addition, the control system 10 may determine the lateral distance from the other motor vehicle 30 (or its longitudinal axis) with respect to a virtual center line (not shown in the figure) of the lane 27 traveled on at that moment. Furthermore, the control system 10 may determine a lateral speed and/or a lateral acceleration of the other motor vehicle 30.

The stated relative speeds between the motor vehicle 12 and the motor vehicle 30 are in each case determined from a ratio of the speeds of the preceding other motor vehicle 30 and of the host motor vehicle 12. These speeds are in turn provided to the electronic control unit 10 of the motor vehicle 12 via data obtained from the surroundings sensors. Based on the relative longitudinal and lateral speeds, it is also possible to derive corresponding relative longitudinal and lateral accelerations between the motor vehicle 12 and the other motor vehicle 30.

Figure 3:
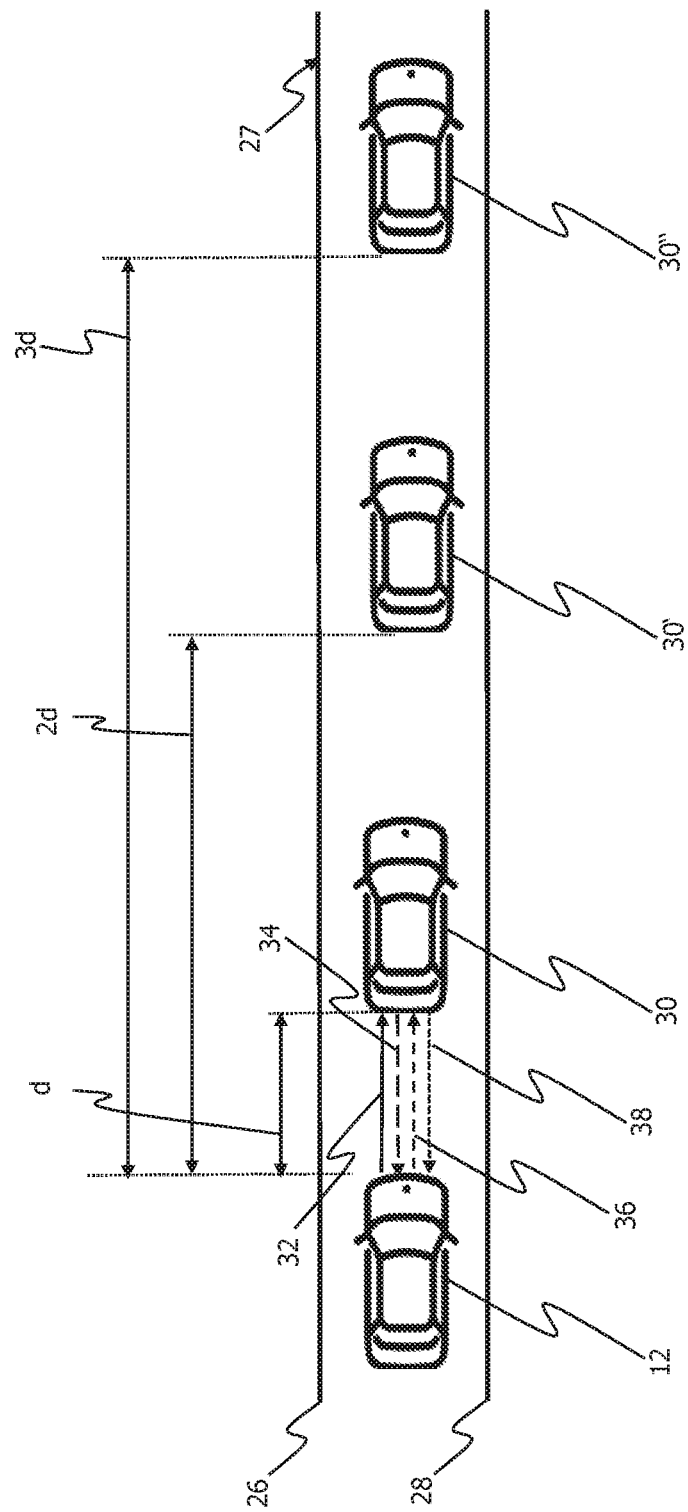
FIG. 3 schematically shows a driving situation with a motor vehicle and another motor vehicle, as well as faulty detections of the other motor vehicle during following travel according to certain exemplary embodiments.

Reference is next made to FIG. 3. Once again the following travel from FIG. 2 is shown, in which the motor vehicle 12 is traveling on the roadway 27, behind the other motor vehicle 30. Also illustrated are two faulty detections 30', 30" of the motor vehicle 30, which are recognized by the control system 10 as potential objects in the area in front of the host motor vehicle 32 [sic; 12]. Within the scope of the present disclosure, these faulty detections are identified as such by the control system 10 and distinguished from real objects such as the other motor vehicle 30.

As illustrated in FIG. 3, the host motor vehicle 12 emits the radar wave 32 in the direction of the other motor vehicle 30. The radar wave 32 is reflected by the motor vehicle 30 and ultimately reaches the motor vehicle 12 as the reflected radar wave 34, where it is detected by the at least one surroundings sensor 14, 16, 18. Here as well, however, a reflection of the radar wave 34 once again takes place, so that a further reflected radar wave 36 is transmitted in the direction of the preceding motor vehicle 30. A reflection 38 originating on the other motor vehicle 30 is also transmitted back from this reflected wave 36 to the host motor vehicle 12, where it is recognized by the at least one surroundings sensor 14, 16, 18. It is understood that the signal strengths of the reflected waves decrease with the number of reflections. Thus, in the example shown in FIG. 3, the signal 32 has the highest signal strength, followed by the signal 34, then followed by the signal 36. The signal 38 represents the weakest signal shown in the figure.

The signals 34, 36, 38 thus all represent reflections of the originally emitted signal 32. These reflections are taken into account by the control system 10 in the identification and classification of faulty detections 30', 30", i.e., objects that do not exist in reality. Of course, the reflections taken into account are not limited to the number of signals 34, 36, 38 illustrated in FIG. 3. It is understood that theoretically an infinite number of reflections occur, provided that a reflective medium (in the present case, the motor vehicles 12, 30 in each case) reflects the signal back. Within the scope of the present disclosure, the reflections may be taken into account up to a predetermined number (the number of times the signal has been reflected), or up to a certain measured signal strength. This also applies to the driving situation, discussed below, that is illustrated with reference to FIG. 5.

Firstly, from the viewpoint of the control system 10 the faulty detections 30', 30" result from the reflections, as illustrated in FIG. 3. The faulty detection 30' is twice the longitudinal distance (2d, not illustrated to scale in FIG. 3) from the motor vehicle 12 compared to the actual object in the form of the motor vehicle 30. As a result, the signal 38 has covered twice the path length as signal 34 (in essentially the same time). Further reflections (not illustrated in FIG. 3 for the sake of clarity) on the motor vehicles 12, 30 additionally result in a faulty detection 30", which from the viewpoint of the control system 10 is three times the distance (3d) from the host motor vehicle 12 compared to the other motor vehicle 30. Accordingly, the number of faulty detections is also a function of the number of reflections taken into account by the control system 10. If scattering of the particular signals is still not taken into account, the number of faulty detections, which in each case is n times the distance d between the host motor vehicle 12 and the other motor vehicle 30, is given by the number n of reflections of the signal 32 on the other motor vehicle 30, minus one.

Figure 4:
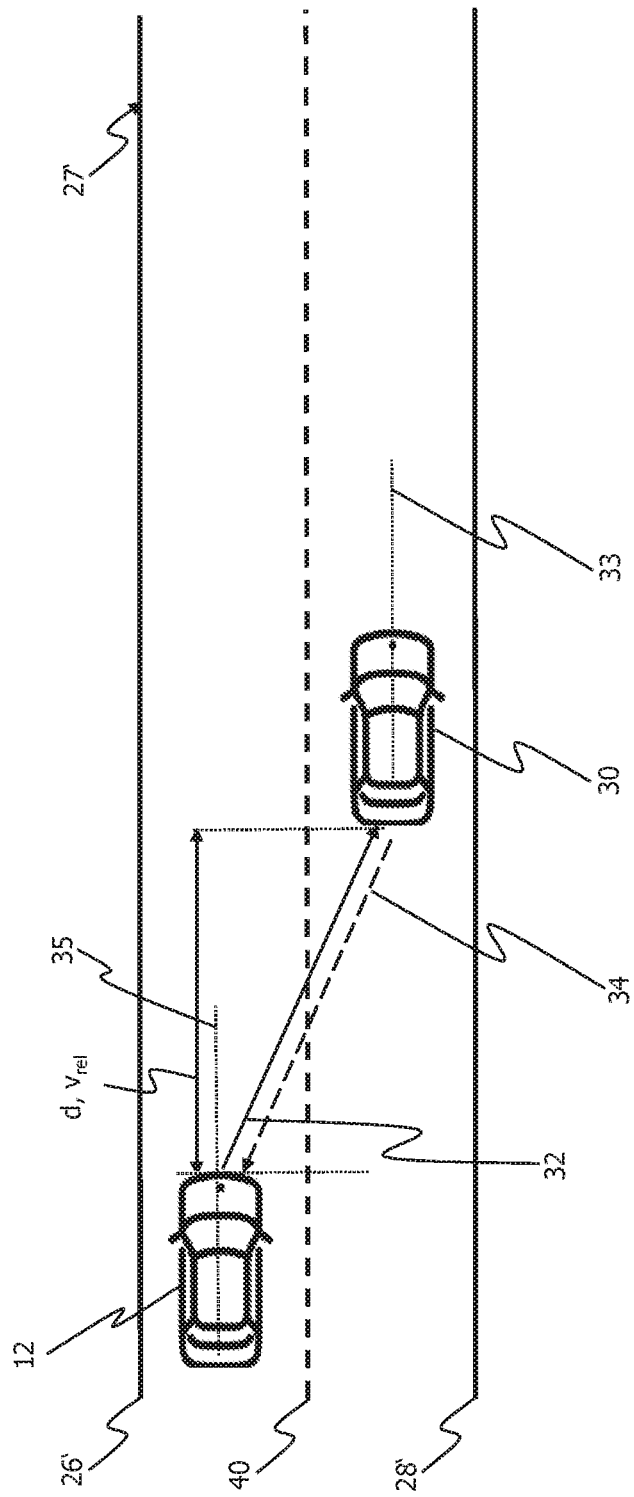
FIG. 4 schematically shows a driving situation with a motor vehicle and another motor vehicle during following travel and a lane offset of the vehicles according to certain exemplary embodiments.
Figure 5:
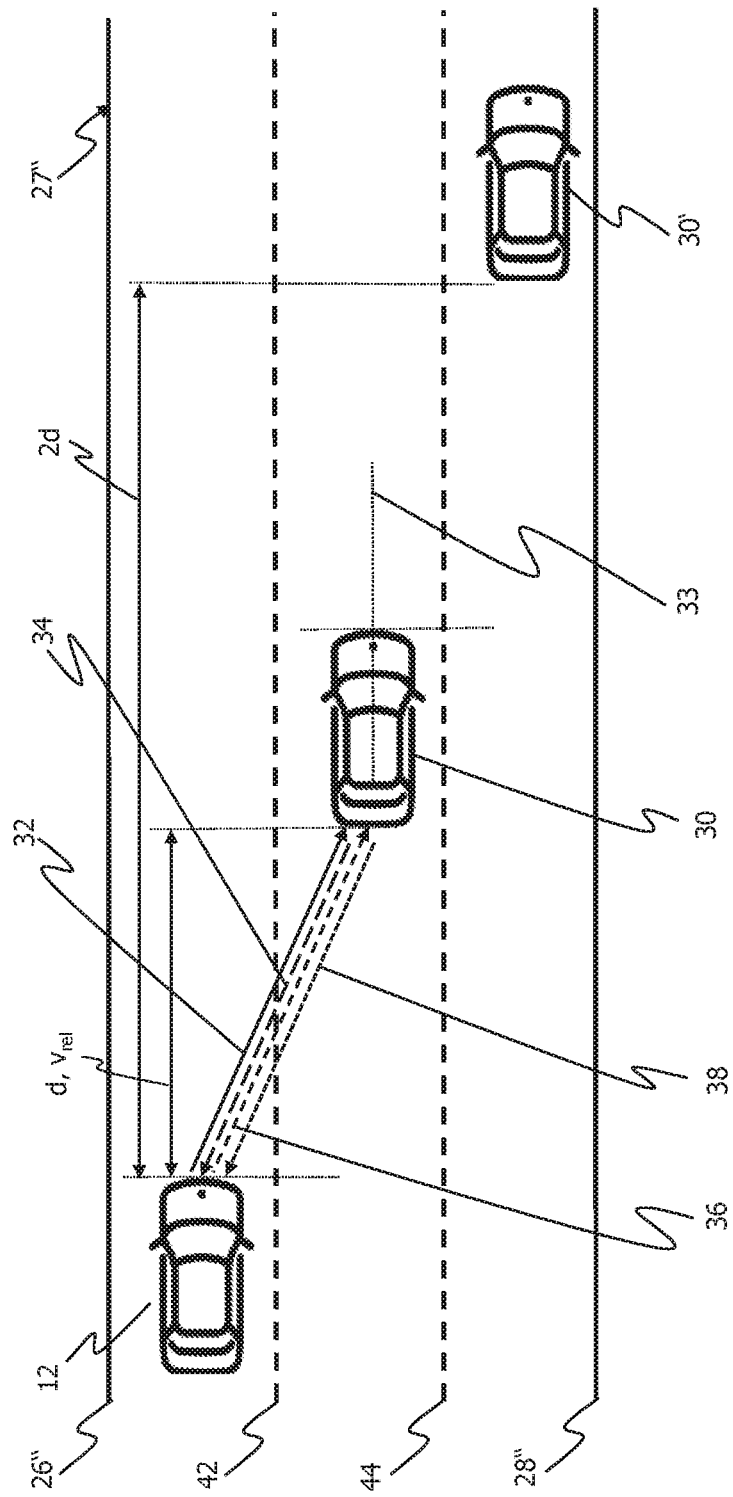
FIG. 5 schematically shows a driving situation with a motor vehicle and another motor vehicle during following travel and a lane offset of the vehicles, as well as a faulty detection of the other motor vehicle according to certain exemplary embodiments.

With reference to FIGS. 4 and 5, a similar driving situation is now described; in this case, however, the motor vehicles 12, 30 are not in the same lane. In FIG. 4, the host motor vehicle is illustrated on a two-lane roadway 27'. The roadway 27' is delimited by a left (lateral) lane marking 26' and a right (lateral) lane marking 28', and additionally has a center line 40 that separates the respective lanes of the roadway 27'. The host motor vehicle 12 is traveling at a distance d behind the other motor vehicle 30, the motor vehicles 12, 30 each being situated on different lanes of the roadway 27'. In this driving situation, this also results in a lateral distance (not shown in the figure) that involves an angular offset of the longitudinal axes 35, 33 of the motor vehicles 12, 30 in relation to the emitted signal 32 (once again denoted as a radar wave in the example according to FIG. 4). Thus, an angle φ (not shown in the figure) exists between the signals 32, 34 for measuring the distance, speed, and optionally acceleration of the other motor vehicle 30 and the longitudinal axis 35 of the host motor vehicle.

When multiple reflections occur, the driving situation from the viewpoint of the control system 10 is as shown in FIG. 5. A third lane is also illustrated here for explanation of the detection principle for the faulty detections. This third lane may, but in reality does not have to, exist as a lane. In the example shown in FIG. 5, the motor vehicle 12 is in the left lane of a three-lane roadway 27", which is delimited by a left (lateral) lane marking 26" and a right (lateral) lane marking 28", and which additionally has two center lines 42, 44 to separate the respective lanes of the roadway 27". The other motor vehicle 30 is traveling ahead of the motor vehicle 12, on an adjacent lane of the roadway 27".

The host motor vehicle 12 emits the radar wave 32 in the direction of the other motor vehicle 30. The radar wave 32 is reflected from the motor vehicle 30 and reaches the motor vehicle 12 as a reflected radar wave 34, where it is detected by the at least one surroundings sensor 14, 16, 18. The appropriate information is provided to the electronic control unit 20 of the control system 10, for example in a suitable data format. The reflection of the radar wave 34 that additionally occurs here results in a further radar wave 36, which is reflected in the direction of the preceding motor vehicle 30. A reflection 38 is also transmitted back from this reflected wave 36 to the host motor vehicle 12, where it is detected. Once again, the signal strengths of the reflected waves 34, 36, 38 decrease with the number of reflections. In the example shown in FIG. 5, the signal 32 has the highest signal strength, followed by the signal 34, in turn followed by the signal 36. The signal 38 represents the weakest signal shown in the figure.

Here as well, the reflections 34, 36, 38 of the originally emitted signal 32 are taken into account by the control system 10 for identifying the faulty detection 30' as such. Once again, the reflections taken into account are not limited to the number of signals 34, 36, 38 illustrated in FIG. 5, since theoretically an infinite number of reflections occur, provided that a reflective medium (in the present case, the motor vehicles 12, 30 in each case) reflects the signal back.

Firstly, from the viewpoint of the control system 10 the faulty detections 30' result from the reflections as illustrated in FIG. 5. Similarly to the example described with reference to FIG. 3, here as well the illustrated number of reflected signals 34, 36, 38 results in a further faulty detection, not illustrated in FIG. 5 for reasons of clarity. The faulty detection 30' is twice the longitudinal distance (2d, not illustrated to scale in FIG. 5) from the motor vehicle 12 compared to the actual object in the form of the motor vehicle 30. As a result, the signal 38 has covered twice the path length as signal 34 (in essentially the same time). Further reflections (not illustrated in FIG. 5) on the motor vehicles 12, 30 result in an additional faulty detection (not illustrated in FIG. 5), which from the viewpoint of the control system 10 is three times the longitudinal distance (3d) from the host motor vehicle 12 compared to the other motor vehicle 30.

In addition, according to FIG. 5, a lateral distance results between the two motor vehicles, since the motor vehicles 12, 30 at that moment are traveling on different lanes of the roadway 27". This also results in an angle 1 (not illustrated in FIG. 5) between the longitudinal axis 35 of the motor vehicle 12 and the signals 32, 34, 36, 38, as previously described with reference to FIG. 4. Since in the example according to FIG. 5, the faulty detection 30' (or a virtual, i.e., imaginary, longitudinal axis thereof) has the same angle, with respect to the signals 32, 34, 36, 38, as the longitudinal axis 35 of the motor vehicle 12, from the viewpoint of the control system this faulty detection is on the right lane of the roadway 27", i.e., offset by a further lane compared to the actually detected object 30.

Also in this example, the number of faulty detections is a function of the number of reflections taken into account by the control system 10. If scattering of the particular signals is still not taken into account, the number of faulty detections, which in each case is n times the distance d between the host motor vehicle 12 and the other motor vehicle 30, is given by the number n of reflections of the signal 32 on the other motor vehicle 30, minus one.

Figure 6:
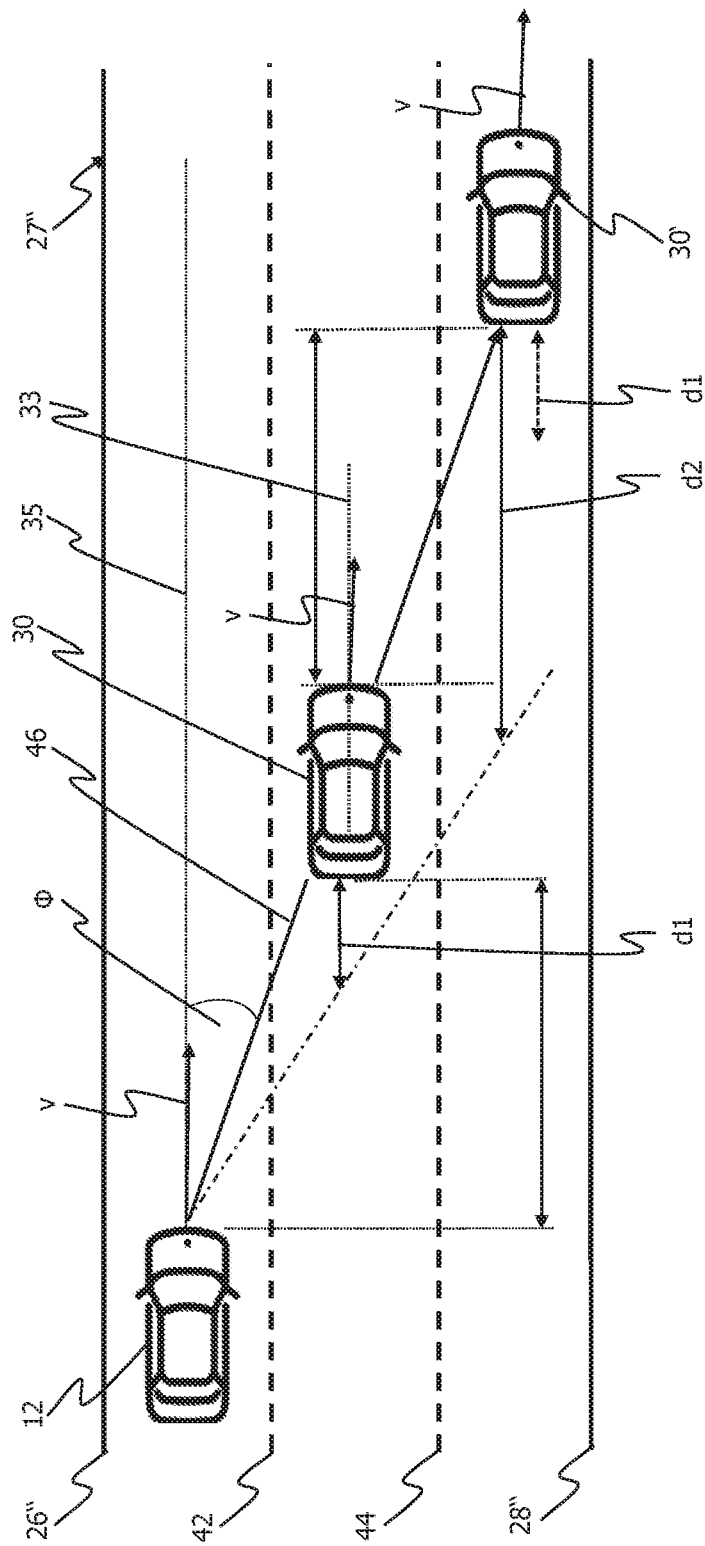
FIG. 6 schematically shows the driving situation from FIG. 5 as well as variables and ratios for a plausibility check of an object classification according to certain exemplary embodiments.

With reference to FIG. 6, a description is now provided of how the mentioned faulty detections are recognized as such by the control system 10 and distinguished from actually existing objects such as other road users (the other motor vehicle 30, for example), in order for them to ultimately be removed from a further processing chain by the electronic control unit 20 and/or the driver assistance system 20.

FIG. 6 shows the angle $\phi$ between a virtual longitudinal axis of the motor vehicle 12 and a radial distance 46 between the motor vehicle 12 and the real object 30 as well as the faulty detection 30'. Within the meaning of the disclosure, this radial distance indicates the distance but is not limited thereto. Thus, the distance used within the scope of the disclosure may also be a longitudinal or lateral distance. In addition, speed vectors v of the motor vehicle 12, of the motor vehicle 30, and of the faulty detection 30' are denoted in FIG. 6. Of course, the mentioned multiple reflections of the sensor signals from FIG. 5, not illustrated in FIG. 6 for reasons of clarity, occur here as well. Otherwise, the example from FIG. 6 represents the driving situation from FIG. 5.

As is apparent from FIG. 6, potential faulty detections, i.e., not real objects, may be identified as such due to the physical relationship between the motor vehicle 12 and the objects detected in a driving situation. The variables of distance, angle, and speed of the real object in the form of the motor vehicle 30 are known to the control system 10 from the provided surroundings data of the at least one surroundings sensor 14, 16, 18, and may thus be correctly detected.

To distinguish between the real object 30 and the faulty detection 30', in this example the above-mentioned variables are considered for the object 30 and the faulty detection 30' in each case. For example, the angle $\phi$ between a virtual longitudinal axis and the signal 32 with a faulty detection 30' does not differ from the angle $\phi$ of the virtual longitudinal axis 35 of the motor vehicle 12 with respect to the signal 32. However, if the distance of the faulty detection 30' with this constant angle is twice the length of the distance of the real object 30 from the motor vehicle, this in fact involves the faulty detection 30'. The same applies when the distance, for a constant angle, is a different multiple of the distance of the motor vehicle 12 from the real object 30.

In contrast, if there is a difference between the angles $\phi$ (between a virtual longitudinal axis and the signal 32 with a faulty detection 30', or between the virtual longitudinal axis 35 of the motor vehicle 12 with respect to the signal 32), a distance covered by an object must also change. This is the case not only for the faulty detection 30', but also for the real object 30. However, in contrast to the real object, this covered distance with the faulty detection 30' is not reflected in the speed, as is apparent from FIG. 6. As shown, for the real object in the form of the motor vehicle 30 at the existing angle $\phi$, this results in a covered distance d1, while the faulty detection 30", assuming the same angle $\phi$, has covered a distance d2. The distance d1 for the faulty detection 30' is indicated as a dashed-line double arrow in FIG. 6, and is used there solely for a comparison to the distance d2 covered by the faulty detection. The object 30' is the faulty detection 30', since the covered distance is not proportional to the speed difference between the speed vector v of the faulty detection 30' and the speed vector v of the motor vehicle 12. The situation is different for the object 30; in this case, the covered distance d1 is proportional to the speed difference between the object 30 and the motor vehicle 12. Accordingly, the object 30 is a real object.

Within the scope of the present disclosure, it is thus possible to not only identify and classify real objects and faulty detections based on their (radial) distances from the motor vehicle 12, but also to utilize the existing physical relationship between the objects as a whole in order to check the classified objects and thus increase the accuracy of the classification. In turn, this has a positive effect on the overall performance of the control system.

With reference to FIG. 7, a control method is now described which, based on surroundings data obtained from at least one surroundings sensor situated on a host motor vehicle 12, distinguishes a real object in the surroundings of the motor vehicle from an erroneously detected object. The control method may be carried out, for example, by the above-described control system 10 of the host motor vehicle 12. All features described within the scope of the control system may also be applied to the control method. In particular, all of the above-described features regarding the processing of multiple reflections, the identification and classification of real and nonexistent objects, and the plausibility checking of the classification are applicable to the control method.

An object in the surroundings of the motor vehicle is detected in a first step S100, based on the provided surroundings data. At least one distance and/or one relative speed and/or one angle between the motor vehicle and the object are/is determined in a second step S102, based on the provided surroundings data. Lastly, the object is classified as an actually existing object or as an erroneously detected object in a third step S104, based on the determined distance and/or the determined relative speed and/or the determined angle.

According to the above discussion, the control system 10 of the host motor vehicle 12 monitors the instantaneous traffic situation in order to distinguish real objects in the surroundings of the motor vehicle 12 from objects that do not exist in reality, so-called faulty detections. Based on this object classification, nonexistent objects may be removed from a further processing chain by the control system 10 or any control or assistance system of the motor vehicle 12 that is coupled to the control system 10. The plausibility check increases the accuracy of the object classification, and thus allows even more efficient suppression of faulty detections in the further processing operation, and thus, even better and more robust recognition and classification of real objects. Lastly, computing resources are thus saved, and the overall performance of the control system is improved.

It is understood that the exemplary embodiments explained above are not exhaustive, and do not limit the subject matter disclosed herein. In particular, it is apparent to those skilled in the art that they may combine the features of the various embodiments with one another and/or omit various features of the embodiments without thereby departing from the subject matter disclosed herein.

The invention claimed is:

1. A control system (10) which for use in a motor vehicle (12) is configured and intended for distinguishing a real object (30) in the surroundings of the motor vehicle (12) from an erroneously detected object (30', 30"), based on surroundings data that are obtained from at least one surroundings sensor (14, 16, 18) situated on the motor vehicle (12), wherein the at least one surroundings sensor (14, 16, 18) is configured for providing to an electronic control unit (20) of the control system (10) at least information concerning objects and/or driving-related information about other motor vehicles in an area (20, 22, 24) in front of, to the side of, and/or behind the host motor vehicle (12), and wherein the control system (10) is at least configured and intended for detecting at least one object (30, 30', 30") in the surroundings of the motor vehicle (12), based on the provided surroundings data, and based on the provided surroundings data, determining at least one distance (d) and/or one relative speed ($v_{rel}$) and/or one angle ($\phi$) between the motor vehicle (12) and the at least one object (30, 30', 30"), classifying the at least one detected object (30, 30', 30"), based on the determined distance (d) and/or the determined relative speed ($v_{rel}$) and/or the determined angle ($\phi$), as an actually existing object (30) or as an erroneously detected object (30', 30"), subjecting the classification to a plausibility check when the object (30, 30', 30") has been classified as an erroneously detected object (30', 30"), and removing the object (30, 30', 30") from subsequent processing by the control system (10) and/or by the electronic control unit (20) of the control system (10) when the plausibility check shows that the object (30, 30', 30") has been correctly identified as an erroneously detected object (30', 30").

2. The control system (10) according to claim 1, wherein the plausibility check shows that the object (30, 30', 30") has been correctly identified as an erroneously detected object (30', 30") when the angle ($\phi$) between the object (30, 30', 30") and the motor vehicle (12) corresponds to an angle ($\phi$) between another detected object (30, 30', 30") and the motor vehicle (12), while the distance and/or the relative speed (vrel) between the object (30, 30', 30") and the motor vehicle (12) are/is different from a distance between the other detected object (30, 30', 30") and the motor vehicle (12).

3. The control system (10) according to claim 1, wherein the plausibility check shows that the object (30, 30', 30") has not been correctly identified as an erroneously detected object (30', 30") when the angle ($\phi$) between the object (30, 30', 30") and the motor vehicle (12) does not correspond to an angle ($\phi$) between another detected object (30, 30', 30") and the motor vehicle (12), while a speed of the object (30, 30', 30") is different from a speed of the other detected object (30, 30', 30").

4. The control system (10) according to claim 1, which is configured and intended for including at least one reflection (36, 38) of at least one signal (34) of the at least one surroundings sensor (14, 16, 18) in the determination of the distance (d) and/or the relative speed ($v_{rel}$) and/or the angle ($\phi$).

5. The control system (10) according to claim 4, wherein the at least one reflection (36, 38) occurs on the object (30, 30', 30") or on the motor vehicle (12).

6. The control system (10) according to claim 1, wherein the object (30, 30', 30") is a moving object.

7. The control system (10) according to claim 5, which is configured and intended for analyzing the reflection (36, 38) of the at least one reception signal (34) of the at least one surroundings sensor (14, 16, 18) with regard to its signal strength.

8. The control system (10) according to claim 1, wherein the at least one surroundings sensor (14, 16, 18) includes a radar sensor and/or a lidar sensor.

9. A motor vehicle (12) that includes a control system (10) according to claim 1.

* * * * *